June 1, 1943.  G. FORRO  2,320,583
MOLD FOR MANUFACTURE OF DIPPED ARTICLES
Filed May 15, 1940  2 Sheets-Sheet 1
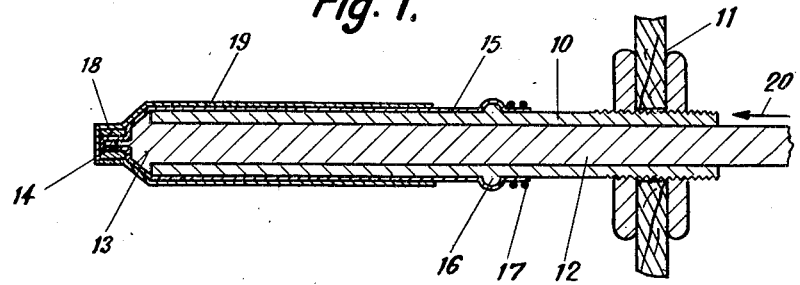
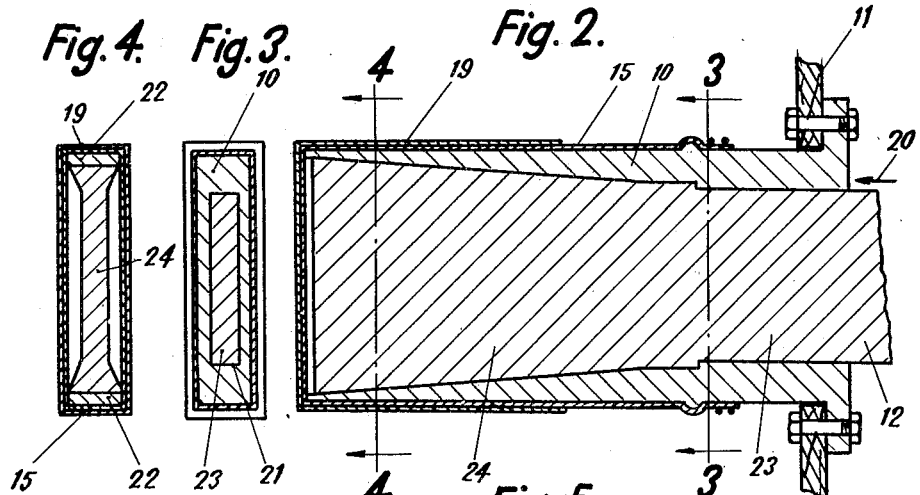
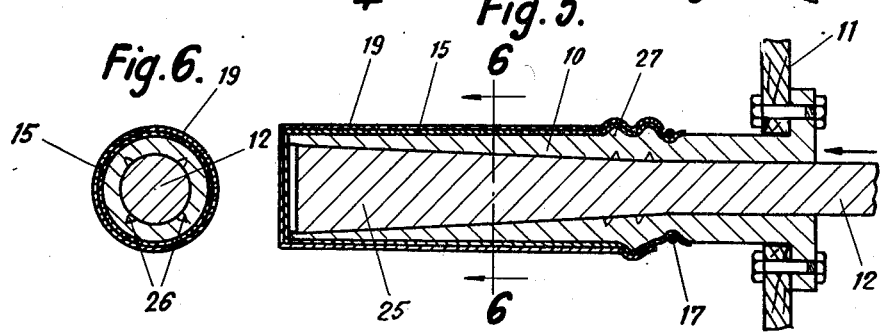
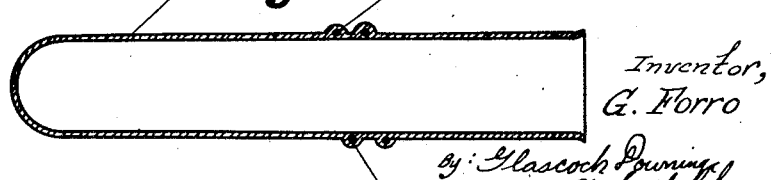

June 1, 1943.　　　　　G. FORRO　　　　　2,320,583
MOLD FOR MANUFACTURE OF DIPPED ARTICLES
Filed May 15, 1940　　　2 Sheets-Sheet 2

Inventor,
G. Forro
By: Glascock Downing Seebold
Attys.

UNITED STATES PATENT OFFICE 2,320,583

MOLD FOR MANUFACTURE OF DIPPED ARTICLES

György Forro, Budapest, Hungary; vested in the Alien Property Custodian

Application May 15, 1940, Serial No. 335,379
In Great Britain August 9, 1938

4 Claims. (Cl. 18—41)

This invention is for improvements in or relating to the manufacture of hollow articles by dipping, molding or the like from settable material, or from already prepared material capable of contraction, such as for example cellulose compounds and polymerised unsaturated organic compounds. The invention is essentially concerned with the molding of hollow articles by means of a mold having a core and an elastic sheath, for instance of rubber, over the core, the plastic material being applied to the outer surface of this sheath.

One object of this invention is to provide a method for removing the article, after setting, from the mold upon which it was formed or set in such a manner that, during the whole process, the whole mold remains intact or need not be dismounted.

According to the present invention the method of forming hollow articles from settable material comprises applying the material before setting to the exterior of a mold consisting of a core covered with an elastic sheath tightly fitted on the core and, after the material has set forming the produced hollow article, deforming the mold by stretching the sheath on the core in one direction thereby causing a reduction in thickness of the mold which will thus contract away from the hollow article to permit the article to be removed. The sheath which is stretched to free a formed article from the mold is allowed to regain its normal form and return to its original position. Thus, the process of manufacturing the article may be repeated without the mold being dismounted.

According to a further feature of the invention the core is hollow, inside of which an operating member is guided in such a manner that the mold is deformable by the alteration of the position of the operating member relatively to the core, and after the material has set forming the produced hollow article, the mold is deformed by relative movement of the core and the operating member to stretch the sheath on the core in one direction causing a reduction or an increase of reduction in thickness of the mold and thereby to contract the same away from the hollow article to permit the article to be removed.

According to another feature of the invention the sheath is provided on the core in such manner that the core offers resistance to movement at one end of the sheath and the sheath is stretched by moving its other end on the core.

It is found to be advantageous in certain cases to use more than one sheath; thus two superposed rubber sheaths may be utilised. It is also possible to use two sheaths of different materials. The core may be rigid or it may be collapsible so that it may be contracted or permitted to contract away from the sheath or sheaths.

According to a feature of the invention the core is collapsible and is extended to the proper size to hold the sheath and after molding the core is collapsed or permitted to collapse so as to retract from the formed article.

In one manner of carrying out the method according to this invention there is applied, between the outer surface of the sheath and the inner surface of the produced article upon it, a fluid (e. g. water or gas or steam) under pressure for removing the produced article from the sheath. In one case the sheath is secured at one end to the core and a fluid under pressure is applied through an opening at its other end between this end of the sheath and the formed article to stretch the sheath due to the adhesion between the sheath and the article. In another case, the stretching of a sheath having one closed end is effected, after setting of the material forming the article, by applying a fluid under pressure between the sheath and the core into the other end of the sheath.

It is advantageous in most cases to apply a lubricant (e. g. a liquid or powder) to the outer surface of the sheath prior to applying the settable material in order to facilitate removal of the article. It is also preferable to employ a lubricant, (e. g. a liquid or powder) between relatively adjacent moving surfaces of the mold. In order further to facilitate the removal of the article after it is formed, the mold with the formed article thereon may be dipped into a liquid to permit the liquid to penetrate between the article and the mold.

According to a further feature of the method according to this invention a part of the article is preformed, for instance a threaded closing part, and is placed in position on the mold so as to be joined with the remainder of the article by the application of the settable material and the subsequent setting or drying thereof. A nozzle for a container article may be formed in this way; alternatively, such a nozzle may be made by making a nozzle part of the article longer by a sufficient amount to enable the long part to be pressed subsequently in conformity with the shape and size of the required nozzle.

One form of the method according to this invention consists in dipping the mold into settable material a number of times to form an article in a plurality of layers of identical or differing materials.

According to another feature of the invention for forming an article in a plurality of parts the method comprises dipping the mold into settable material to form a part of the article, applying a removable coating to this part while still on the mold, again dipping the mold into settable material to form another part over the first and removing the said coating to separate the formed parts. This method may be applied to the construction of an article consisting of a container and a cap for the container.

The invention further comprises a mold for manufacturing hollow articles from settable materials comprising a core consisting of one or more components covered partly or completely by one or more elastic sheaths, and means engaging an end of the sheath or sheaths and movable relatively to the core for stretching the sheath or sheaths. In one form the core is hollow and an operating member movable in the core serves to form, engage and stretch the sheath. In a construction of this form of mold the sheath is closed over one end of the core and is secured directly or indirectly to the core at the other end, and the core is hollow and an operating member is movable in the core and engages the closed end of the sheath for stretching the sheath. The core may be rigid or it may be deformable and in one construction the core consists of a hollow flexible structure, e. g. consisting of rubber or a spring and the operating member is movable in the core to cause its deformation. The operating member may serve both to stretch the sheath and to permit the core to collapse. This collapse of the core assists in freeing the article. The core and/or the sheath may be formed with surface projections or recesses to produce correspondingly shaped parts in the formed articles. Furthermore, it is convenient to provide grooves in the co-operating surfaces of the core and the operating member for reducing friction.

The invention also comprises a hollow article made according to the method hereinbefore specified and the article may comprise one or more layers of the same or different materials, for instance, a cellulose derivative or artificial resin. Where a number of layers is employed a softening agent may be introduced into the outer layers.

Examples of molds and methods of molding according to the invention are hereinafter described with reference to the accompanying drawings, in which:

Figure 1 is a longitudinal section of one form of mold;

Figure 2 is a longitudinal section of another form of mold;

Figure 3 is a section on line 3—3 of Figure 2;

Figure 4 is a section on line 4—4 of Figure 2;

Figure 5 is a longitudinal section of a further form of mold;

Figure 6 is a section on line 6—6 of Figure 5;

Figure 7 is a longitudinal section of a construction of sheath;

Like references indicate like parts throughout the figures of the drawings.

Figure 8:
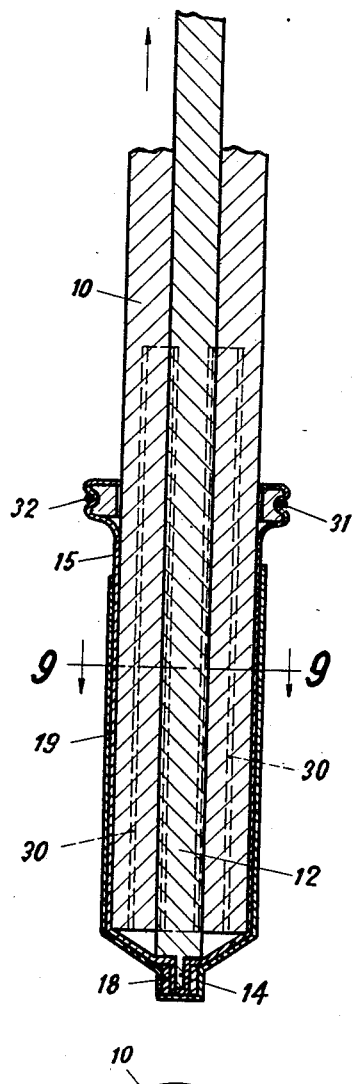
Figure 8 is a longitudinal section of a further form of mold.

In Figure 1 there is shown a mold suitable for the production of a container in the shape of the usual containers for toothpaste and the like. The mold comprises a tubular core 10 fixed to a wall 11. In the core 10 a rod 12 is slidably mounted. This rod has a head 13 serving to prevent the rod sliding back into the core 10 and also serving to support the sheath to form the conical end of the mold. The head 13 has a projecting spigot 14. The exterior surface of the core, the head 13 and the spigot 14 are covered by a sheath 15 of rubber or other supple elastic material passing over a thickened part 16 of the core and being fastened to the core beyond this thickened part by suitable means such as a wire winding 17.

Before the dipping operation is commenced a preformed ring 18, possibly provided with internal screw-threads, of a material similar to that from which the container is to be made, or of any other material, is placed upon that part of the rubber sheath 15 covering the spigot 14. The mold is then immersed in a flowable plastic, for example, cellulose acetate, to provide a layer on the mold, as indicated at 19, to constitute the article. After the setting of the article 19 the rod 12 is moved in the direction indicated by the arrow 20. The inner end of the sheath 15 being fixed, this movement causes the sheath 15 to be stretched and thereby contracted away from the article 19, so that this latter may be easily removed from the molding device. In the molding process the ring 18 becomes united with the rest of the container.

The removal of the article 19 may be facilitated by introducing a fluid, such as air, or cold or warm water, under pressure between the surface of the sheath 15 and the article 19 and/or by introducing a lubricating agent between the sheath and the article.

The dipping or immersion of the mold into the solution of a plastic may be repeated one or more times. The mould may be dipped repeatedly into the solution of the same material or if it is intended to produce layers of different materials, into solutions of materials of different chemical and/or physical properties. As an example it may be stated that the mold may first be dipped into polyvinyl chloride or into a solution of some other material, e. g. synthetic resin, it being pointed out that for the production of the first or inner layer, particularly vinyl derivatives, are adapted. The inner or first layer may also consist of a mixture of artificial resins and cellulose derivatives.

The number and nature of the layers employed depends on the properties required for the article to be produced. If, for example, it is intended to produce containers with soft and flexible walls, the mold with the first layer set upon it, is dipped into a solution of some other material the chemical and/or physical properties of which influence or complete the properties of the first layer in the manner required. In case that the first layer consists for example of polyvinyl chloride, the second layer may be formed of cellulose acetate or any other cellulose derivative, or some artificial resin, e. g. a synthetic resin or a rubber-like vinyl derivative.

The production of the container by more than one layer has the effect that the resistance of the container against the substance kept in it will be increased. Even in the case where this substance may attack the first or inner layer consisting for example of polyvinyl chloride, this penetration may be stopped by the outer layer or layers.

The suppleness or flexibility of the molded article can be further increased by applying one or more further layers containing softening agents. For example, a third layer may be formed of polyvinyl chloride containing a softener and a fourth layer of cellulose acetate similarly containing a softener may be provided. The sequence of these two layers can be inverted and their basic material may, instead of polyvinyl chloride and cellulose acetate, be any one of the above-mentioned cellulose derivatives, artificial resin or the like. Any of the layers may contain simultaneously two or more of the above-named substances.

Figures 2 to 4 show a mold for the production of containers of rectangular cross-section. The core 10 is in this case of rectangular cross-section and the sheath 15 of rubber or the like is fixed over the core in the same manner as in the construction shown in Figure 1. This core 10 has a rectangular bore 21 at its inner end and at its outer end the core is constituted by two opposite walls 22 only. Within this bore there is a rod 23 of rectangular cross-section movable in the bore 21, this rod having an outer splayed part 24 between the walls 22 of the core. In the assembly of the mold the walls 22 which are somewhat resilient are spread by the core 10. After the dipping operation to produce the article 19 over the sheath 15 the rod is moved in the direction of the arrow 20 so that the outer end of the rod moving against the adjacent part of the sheath 15 stretches the latter so as to contract it away from the walls of the container 19. In addition, this movement of the rod 23 permits the walls 22 of the core to move towards one another so that the mold is collapsed to assist in freeing the container 19 from the mold.

In the construction shown in Figures 5 and 6 the core 10 is formed of rubber and the rod 12 has a conical portion 25 movable in a correspondingly shaped bore in the core 10 so as to expand the core to the required dimensions to hold the sheath for molding and afterwards allow the core to contract by displacement of the rod 12 as described with reference to Figures 2 to 4. The inner wall of the core 10 may be formed with grooves 26 in order to reduce the friction between the core and the rod 12. Alternatively, or in addition, similar grooves may be provided in the outer surface of the rod 12 and to facilitate the movement of the rod 12 a lubricant may be introduced into the grooves.

In the construction shown in Figures 5 and 6 the core 10 is formed with a screw-thread 27 in order to produce a corresponding screw-thread on the container 19 and other required projections or recesses in the wall of the container may be produced in like manner. The sheath 15 in this case overlies the screw-threads 27 and is fixed by means of the wire-winding 17 holding the end of the sheath in a groove in the core. Instead of forming the screw-thread or other mold-shape on the core it may be formed on the sheath. In Figure 7 there is shown a rubber sheath 15 in which a screw-thread 28 is formed on the exterior of the sheath, either by embedding a core-spring or a core-wire 29 in the surface of the sheath. The sheath or sheaths are prolonged beyond the screw-threaded part so that they may be stretched to a sufficient extent.

Figure 9:
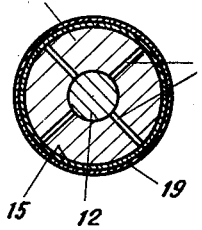
Figure 9 is a section on line 9—9 of Figure 8.

In Figures 8 and 9 the core 10 is formed with longitudinal and radially extending slots 30 which render the core to some extent deformable, and the presence of the operating rod 12 in the core serves to spread the core to the required size to hold the sheath for the molding operation. The sheath 15 is connected at one end by means of a wire-winding 31 to a slider 32 movable on the core 10, the other end being fixed in relation to the core by the engagement of the closed end with the end of the core 10 and rod 12. After the dipping operation to form the article 19 on the mold, the sheath 15 is stretched by moving the slider 32 along the core in the direction away from the formed article in order to release this container from the mold. The removal of the article 19 may also be assisted by dipping the mold with the article on it into a liquid so that the latter penetrates between the sheath 15 and the article 19. Then on lifting the mold from the liquid the article 19 is easily removed from the mold by the weight of the liquid which has penetrated into the article and by the lubricating effect of this liquid.

Figure 10:
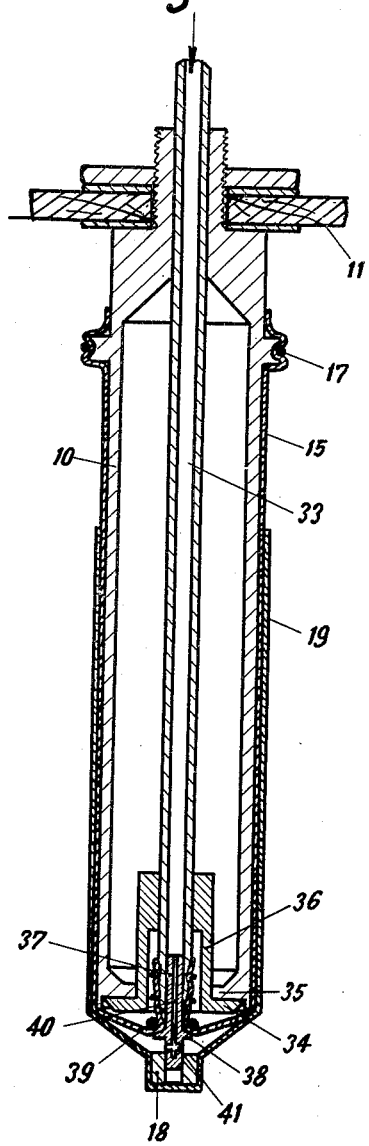
Figure 10 is a longitudinal section of yet another mold construction.

In Figure 10 there is shown a construction of mold in which a fluid under pressure is used to separate the formed article from the mold. The core 10 serves as a guide for a tube 33 taking the place of the operating rod 12 in the constructions previously described. The outer end of this tube is secured to a head 34 which can rest against a flange 35 formed on the core 10. This head 34 has a cylindrical portion 36 slidable in a corresponding opening in the flange 35. A plug 37 is secured in the end of the tube 33 and has a flange 38 for receiving the sheath 15. The sheath 15 is in this case open at both ends. One end is secured to the core by the wire 17 on a thickened part of the core. The other end of the sheath 15 is held by a screw-threaded plug 37 in suitable position on the flange 38 by means of a washer 39 and may be attached to the end of the tube 33 for instance by means of yarn. The plug 37 is formed with a bore 40 communicating with the tube 33 and with an outlet 41 at the exterior of the sheath 15.

During the molding operation the tube 33 is projected, so that the head 34 stands away from the flange 35 and the end portion of the sheath 15 takes the conical shape of the article to be molded. A ring 18 (provided, for instance, with an external screw-thread) to form part of the article, may be in this case mounted, prior to the dipping, on the outer end of the plug 37 covering its outlet 41.

After the molding has been accomplished the tube 33 may be pushed out to stretch the sheath as described in the previous examples, and is then withdrawn to the position shown in Figure 10. The withdrawal may be effected by fluid introduced under pressure into the tube 33 through its open end. The fluid passes out of the plug 41 between the sheath 15 and the molded article 19 and tends to move the article from the mold. The rubber sheath 15 is stretched, due to the adhesion between the sheath and the article, so that the sheath is contracted and the article 19 is consequently released. The complete removal of the article from the mold may thus be effected by the fluid under pressure applied through the tube 33. The withdrawal of the tube 33 releases the sheath 15 from the head 34. This withdrawal of the tube 33 is restricted by the head 34 coming into contact with the flange 35.

A plurality of molds may be mounted on a single base 11 or may be connected in any other suitable manner so that they may be dipped into the flowable plastic simultaneously. Moreover, the operating rods 12 or the equivalent tubes 33 or sliders 32, may also be connected together or arranged for operation by an operating member common to them, for simultaneous operation. Fluid under pressure may be supplied to a plurality of tubes 33 of the molds simultaneously or in succession for instance by means of a distributor.

The above methods can be applied also in the use of sheaths made of materials other than rubber. Instead of the rigid core, for instance, of Bakelite or glass, a resilient or elastically deformable core of metal or other suitable material, covered by a sheath of material such as rubber, may be used. In certain cases two or more sheaths may be used, such for instance a sheath made by pressing and providing with projecting parts, e. g. threads may be covered by a second sheath, having a smooth and glossy surface. The core may be formed by a spring, in which case the deformation is effected by the longitudinal stretching which results in a diminution in the diameter of both the core and the sheath.

A cylindrical container having a flat end may be made by applying a suitable material to a mold consisting of a cylindrical core having longitudinal slits at one end which is covered by a tightly fitted elastic sheath, the closed end of which bridges the end of the core. During the process of application of the material, a tapered tube passing axially through the centre of the core keeps the core and thereby the sheath to the size of the container to be made and the said tube may project slightly through the sheath to which it is attached, similarly as in the case of Figure 10. A valve may be employed for instance in the tube, to prevent the settable material passing into the interior of the tube. After the container has been formed and dried, the central tube is moved longitudinally of the core, as in the case of Figure 10, so as to permit the core and the sheath to diminish in circumference. At the same time this longitudinal movement pulls the end of the sheath, which is attached to the tapered tube, away from the end of the container, leaving a space between them. Compressed air or other fluid under pressure, is then allowed to pass up to the central tube, out past the valve, and to enter the space so left, thus blowing the container off the core and sheath.

In order to produce containers consisting of two parts such for example containers for toothbrushes, it is possible to form the two parts of the container on the same mold thus saving the use of a second mold and ensuring that the two parts have the proper size and shape relationship. In order to do this, one part of the container is first made by dipping the mold into a settable material and drying or otherwise setting the material on the mold. The mold carrying the dried container is then dipped into a material which forms an intermediate layer on the container and the mold is then dipped into the settable material again to produce the co-operating part of the container. The two parts of the container are then removed by any of the methods referred to above from the mold in one piece and then separated from one another; where the intermediate layer is gelatine the two parts may be removed by plunging them into warm water, and when the gelatine is dissolved, the parts are then readily separable. Before covering the first molded article with the intermediate layer, it is advisable to make a hole in this article, e. g., in its top part to enable later the easy separation of the parts of the article.

It will be appreciated that any of the processes described hereinbefore may be utilised in combination with one another as required. A waterproof article may be produced by forming a layer of waterproof material on either the inside or the outside of the article, or both, in a manner similar to that in which the article itself is formed; for instance, a layer of Polystyrol or of the material known under the registered trade-mark "Vinylite" may be produced by a separate dipping.

It will be appreciated that the hollow articles may be formed with a variety of markings, for example, devices or words or screw-threads, by suitable shaping the molds. The shaping may be effected by stamping the desired marking on to the core or forming a thread on the core; alternatively, the sheath may be so formed as to produce the required effect.

What I claim is:

1. A mold for manufacturing hollow articles from settable materials comprising a deformable sheath, a core covered at least partly by said sheath, and means engaging an end of the sheath and movable relatively to the core for stretching the sheath.

2. A mold as claimed in claim 1, wherein the core is hollow and said stretching means includes an operating member movable in the core serves to form, engage and stretch the sheath.

3. A mold as claimed in claim 1, wherein the sheath is closed over one end of the core and is secured to the core at the other end and wherein the core is hollow, said stretching means being movable in the core and engaging the closed end of the sheath for stretching the sheath.

4. A mold as claimed in claim 1, wherein the core is a deformable hollow flexible structure, and wherein the stretching means is movable in the core to cause its deformation.

GYÖRGY FORRO.